(12) United States Patent
Kapoor et al.

(10) Patent No.: US 7,287,019 B2
(45) Date of Patent: Oct. 23, 2007

(54) DUPLICATE DATA ELIMINATION SYSTEM

(75) Inventors: Rahul Kapoor, Bellevue, WA (US); Venkatesh Ganti, Redmond, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 10/453,992

(22) Filed: Jun. 4, 2003

(65) Prior Publication Data

US 2004/0249789 A1    Dec. 9, 2004

(51) Int. Cl.
*G06F 17/30* (2006.01)
(52) U.S. Cl. .................. 707/2; 707/3; 707/4; 707/5; 707/6; 707/200
(58) Field of Classification Search .............. 707/2, 707/6, 7, 10, 3, 4, 5, 200
See application file for complete search history.

(56) References Cited

U.S. PATENT DOCUMENTS 5,497,486 A * 3/1996 Stolfo et al. .................. 707/7
2004/0158562 A1* 8/2004 Caulfield et al. ............. 707/5

OTHER PUBLICATIONS

J.A. Aslam, K. Pelekov and D. Rus. Static and Dynamic Information Organization with Star Clusters. CIKM 1998, pp. 208-217.*

R. Ananthakrishna, S. Chaudhuri and V. Ganti. Eliminating Fuzzy Duplicates in Data Warehouses. In *Proceedings of VLDB*, Hong Kong, 2002.
A.N. Arslan, O. Egecioglu and P.A. Pevzner. A New Approach to Sequence Comparison: Normalized Local Alignment. *Bioinformatics*. 17(4):327-337, 2001.
J.A. Aslam, K. Pelekhov and D. Rus. Static and Dynamic Information Organization with Star Clusters. *CIKM* 1998, pp. 208-217.
J.A. Aslam, K, Pelekhov and D. Rus. A Practical Clustering Algorithm for Static and Dynamic Information Organization. *ACM-SIAM Symposium on Discrete Algorithms*, 1999.
V. Borkar, K Deshmukh and S. Sarawagi. Automatic Segmentation of Text Into Structured Records. In *Proceedings of ACM SIGMOD Conference*, Santa Barbara, CA, May. 2001.
A. Broder, S. Glassman, M. Manasse and G. Zweig. Syntatctic Clustering of the Web. In *Proc. Sixth Int'l. World Wide Web Conference, World Wide Web Consortium*, Cambridge, pp. 391-404, 1997.

(Continued)

*Primary Examiner*—Hung Q Pham

(57) ABSTRACT

A process for finding a similar data records from a set of data records. A database table or tables provide a number of data records from which one or more canonical data records are identified. Tokens are identified within the data records and classified according to attribute field. A similarity score is assigned to data records in relation to other data records based on a similarity between tokens of the data records. Data records whose similarity score with respect to each other is greater than a threshold form one or more groups of data records. The records or tuples form nodes of a graph wherein edges between nodes represent a similarity score between records of a group. Within each group a canonical record is identified based on the similarity of data records to each other within the group.

12 Claims, 3 Drawing Sheets

OTHER PUBLICATIONS

K. Beyer, J. Goldstein, R. Ramakrishnan and U. Shaft. When is "Nearest Neighbor" Meaningful? *International Conference on Database Theory*, pp. 217-235. Jan. 1999.

S. Chaudhuri, K. Ganjam, V. Ganti and R. Motwani, Robust and Efficient Fuzzy Match for Online Data Cleaning. In *Proceedings of ACM SIGMOD*, San Diego, CA Jun. 2003.

W. Cohen. Integration of Heterogenous Databases Without Common Domains Using Queries Based on Textual Similarity. In *Proceedings of ACM SIGMOD*, pp. 201-212, Seattle, WA Jun. 1998.

R. Forino. *Data e.quality: A behind the Scenes Perspective on Data Cleansing.* http:www.dmreview.com/, Mar. 2001.

H. Galhardas, D. Florescu, D. Shasha, E. Simon and C. Saita. Declarative Data Cleaning: Language, Model, and Algorithms. In *Proceedings of the 27th International Conference on Very Large Databases*, pp. 371-380, Roma, Italy, Sep. 11-14, 2001.

H. Galhardas, D. Florescu, D. Shasha and E. Simon. An Extensible Framework for Data Cleaning. In *ACM SIGMOD*, May 1999.

L. Gravano, P. Ipeirotis, H.V. Jagadish, N. Kousas, S. Muthukrishnan and D. Srivastava. Approximate String Joins in a Database (Almost) For Free. In *Proceedings of the VLDB 2001*.

V. Ganti, J. Gehrke and R. Ramakrishnan. Cactus-Clustering Categorical Data Using Summaries. In *Proceedings of the ACM SIGKDD Fifth International Conference on Knowledge Discovery in Databases*, pp. 73-83, Aug. 15-18, 1999.

D. Gibson, J. Kleinberg and P. Raghavan. Clustering Categorical Data: An Approach Based on Dynamical Systems, *VLDB 1998*, New York City, New York, Aug. 24-27.

S. Guha, R. Rastogi and K. Shim. Rock: A Robust Clustering Algorithm for Categorical Attributes. In *Proceedings of the IEEE International Conference on Data Engineering*, Sydney, Mar. 1999.

Y. Huhtala, J. Karkkainen, P. Porkka and H. Toivonen. Efficient Discovery of Functional and Approximate Dependencies Using Partitions. In *Proceedings of the 14th International Conference on Data Engineering (ICDE)*, pp. 392-401, Orlando, Florida, Feb. 1998.

M. Hernandez and S. Stolfo. The Merge/Purge Problem for Large Databases. In *Proceedings of the ACM SIGMOD*, pp. 127-138, San Jose, CA May 1995.

J. Madhavan, P. Bernstein, E. Rahm. Genetic Schema Matching with Cupid. *VLDB* 2001, pp. 49-58, Roma, Italy.

A. Monge and C. Elkan. The Field Matching Problem: Algorithms and Applications. In *Proceedings of the Second International Conference on Knowledge Discovery and Databass (KDD)*, 1996.

A. Monge and C. Elkan. An Efficient Domain-Independent Algorithm for Detecting Approximately Duplicate Database Records. In *Proceedings of the SIGMOD Workshop on Data Mining and Knowledge Discovery*, Tucson, Arizona, May 1997.

F. Naumann and C. Rolker. Do Metadata Models Meet IQ Requirements? In *Proceedings of the International Conference on Data Quality (IQ), MIT*, Cambridge, 1999.

E. Rahm and H. Hai Do. Data Cleaning: Problems and Current Approaches. *IEEE Data Engineering Bulletin*, 23(4):3-13, Dec. 2000.

V. Raman and J. Hellerstein. Potter's Wheel: An Interactive Data Cleaning System. *VLDB 2001*, pp. 381-390, Roma, Italy.

S. Sarawagi and A. Bhamidipaty. Interactive Deduplication Using Active Learning. In *Proceedings of the Eighth ACM SIGKDD International Conference on Knowledge Discovery in Databases*, Edmonton, Canada, Jul. 23-26, 2002.

\* cited by examiner

DUPLICATE DATA ELIMINATION SYSTEM

FIELD OF THE INVENTION

The present invention concerns data cleaning for use in databases to avoid storing records that correspond to the same data in the database.

BACKGROUND ART

Decision support analysis on data warehouses influences important business decisions; therefore, accuracy of such analysis is crucial. However, data received at the data warehouse from external sources usually contains errors, e.g., spelling mistakes, inconsistent conventions across data sources. Hence, significant amount of time and money are spent on data cleaning, the task of detecting and correcting errors in data.

Identifying and eliminating duplicated data is one of the major problems in the broad area of data cleaning and data quality. Many times, the same logical real world entity may have multiple representations in the data warehouse. For example, when Lisa purchases products from SuperMart twice, she might be entered as two different customers—[Lisa Simpson, Seattle, Wash., USA, 98025] and [Lisa Simson, Seattle, Wash., United States, 98025]—due to data entry errors. Such duplicated information can significantly increase direct mailing costs because several customers like Lisa may be sent multiple catalogs. Moreover, such duplicates can cause incorrect results in analysis queries (say, the number of SuperMart customers in Seattle), and erroneous data mining models to be built. The problem of detecting and eliminating multiple distinct records representing the same real world entity is referred to as the fuzzy duplicate elimination problem, which is sometimes also called merge/purge, dedup, record linkage problems. See M. Hernandez and S. Stolfo. "The merge/purge problem for large databases." In Proceedings of the ACM SIGMOD, pages 127-138, San Jose, Calif., May 1995. See also A. Monge and C. Elkan. "An efficient domain independent algorithm for detecting approximately duplicate database records." In Proceedings of the SIGMOD Workshop on Data Mining and Knowledge Discovery, Tucson, Ariz., May 1997. And also I. P. Felligi and A. B. Sunter. "A theory for record linkage." Journal of the American Statistical Society, 64:1183-1210, 1969.

This problem is different from the standard duplicate elimination problem, say for answering "select distinct" queries, in relational database systems which considers two tuples to be duplicates if they match exactly on all attributes. However, data cleaning deals with fuzzy duplicate elimination. In the following, the term duplicate elimination is used to mean fuzzy duplicate elimination.

Duplicate elimination is hard because it is caused by several types of errors like typographical errors, and equivalence errors-different (non-unique and non-standard) representations of the same logical value. For instance, a user may enter "WA, United States" or "Wash., USA" for "WA, United States of America." Equivalence errors in product tables ("winxp pro" for "windows XP Professional") are different from those encountered in bibliographic tables ("VLDB" for "very large databases"), etc.

A common approach for identifying duplicates is the use of a duplication function—a function indicating whether two given tuples are fuzzy duplicates or not. Moreover, most common duplication functions employ thresholded similarity functions as duplication functions. That is, the duplication function has two components: a similarity function sim and a threshold value c. If the similarity sim(v1, v2) between two tuples v1 and v2 is greater than or equal to c, then v1 is identified as a duplicate of v2.

In the prior art, techniques addressing the problem of identifying fuzzy duplicates assumed that the relationship "is a duplicate of" is transitive. That is, if tuple v1 is a duplicate of v2, and v2 is a duplicate of v3, then v1 is also considered a duplicate of v3. However, this approach lacks robustness if the duplication function is not precise. That is, if the duplication function is prone to mistakes indicating two tuples that are not duplicates as duplicates and vice versa then the assumption of transitivity further increases the amount of error. In practice, most duplication functions are based on the similarity, according to a chosen similarity function, between two tuples being higher than a threshold See M. Hernandez et al and A. Monge et al cited above. This class of duplication functions is not transitive.

Several proposals have been made for the problem of duplicate elimination (e.g., Feligi et al above, B. Kilss and W. Alvey. Record linkage techniques—1985. Statistics of income division. Internal revenue service publication, 1985. Available from http://www.bts.gov/fcsm/methodology/., Hernandez et al, Alvaro Monge and Charles Elkan. "The field matching problem: Algorithms and applications." In Proceedings of the second international conference on knowledge discovery and databases (KDD), 1996. W. Cohen. "Integration of heterogeneous databases without common domains using queries based in textual similarity." In Proceedings of ACM SIGMOD, pages 201-212, Seattle, Wash., June 1998.).

As mentioned earlier, these methods rely on threshold-based textual similarity functions to detect duplicates, and hence do not detect equivalence errors unless the thresholds are sufficiently lowered; lower thresholds result in an increase in the number of false positives. The record linkage literature also focuses on automatically determining appropriate thresholds (See Felligi et al and Kilss et al), but still suffers from the false positive explosion while detecting equivalence errors. Gravano et al. proposed an algorithm for approximate string joins, which in principle can be adapted to detect duplicate records. See Helena Galhardas, Daniela Florescu, Dennis Shasha, Eric Simon, and Cristian Saita. "Declarative data cleaning: Language, model, and algorithms." In Proceedings of the 27th International Conference on Very Large Databases, pages 371-380, Roma, Italy, Sep. 11-14 2001. Since they use the edit distance function to measure closeness between tuples, their technique suffers from the drawbacks of strategies relying only on textual similarity functions. Aslam et al develop (See A. Aslam, K. Pelekhov, D. Rus. Static and Dynamic Information Organization with Star Clusters. CIKM 1998, pages 208-217.) an algorithm for grouping tuples in a relation into "star" groups with one central tuple connected to by several fringe tuples. The input to the algorithm already consists of all pairs of fuzzy duplicates which, is the most expensive part of the duplicate identification.

A significant amount of work exists in other related aspects of data cleaning: the development of transformational cleaning operations. See Vijayshankar Raman and Joe Hellerstein. Potter's wheel: An interactive data cleaning system. VLDB 2001, pages 381-390, Roma, Italy. And Galhardas et al above. The detection and the correction of formatting errors in address data (See Vinayak Borkar, Kaustubh Deshmukh, and Sunita Sarawagi. Automatic segmentation of text into structured records. In Proceedings of ACM Sigmod Conference, Santa Barbara, Calif., May 2001.), and the design of "good" business practices and process flows prevent problems of deteriorating data quality (See Felix Naumann and Claudia Rolker. Do metadata models meet iq requirements? In Proceedings of the international conference on data quality (IQ), MIT, Cambridge, 1999.) Automatic detection of integrity constraints (functional dependencies and key—foreign key relationships) so that they can be enforced in future to improve data quality are complementary to techniques for cleaning existing data. Because of the commercial importance of the data cleaning problem, several domain-specific industrial tools exist. Galhardas provides a nice survey of many commercial tools. See Helena Galhardas.Data cleaning commercial tools.http://caravel.inria.fr/~galharda/cleaning.html.

Other work has exploited the existence of dimensional hierarchies to identify equivalence errors at various levels of the hierarchy See R. Ananthakrishna, S. Chaudhuri, and V. Ganti. Eliminating fuzzy duplicates in data warehouses. In Proceedings of VLDB, Hong Kong, 2002.

SUMMARY OF THE INVENTION

The disclosed system identifies duplicate records in a database even though they may not be exact matches. The disclosed fuzzy duplicate identification process is based on the fact that the duplication function is only an approximation of an ideal duplication function. An efficient process for determining groups of similar records is disclosed. These similar records form the basis of determining a canonical tuple, which is a representative tuple, from a group of fuzzy duplicates.

The system finds similar data records from a set of data records. In one embodiment the records are provided from a database table from which one or more canonical data records are identified. Scores are assigned to records or tuples based on their similarity to other records. If for example, a record is very similar to another specified record it is assigned a high score with respect to that other record.

After assigning the scores, data records are grouped together based on the similarity score if that score is greater than a threshold. The one or more groups of data records form nodes of a graph wherein edges between nodes represent a similarity score between records or tuples that make up a group. Within each group a canonical record is identified based on the similarity of data records to each other within the group.

In accordance with one exemplary embodiment, tokens are identified within the data records and those records are classified according to attribute field. The records are assigned a similarity score in relation to other data records based on a similarity between tokens of the data records.

These and other objects advantages and features of the invention are described in greater detail in the accompanying discussion of exemplary embodiments of the invention which are described in conjunction with the accompanying drawings.

EXEMPLARY MODE FOR PRACTICING THE INVENTION

Figure 1:
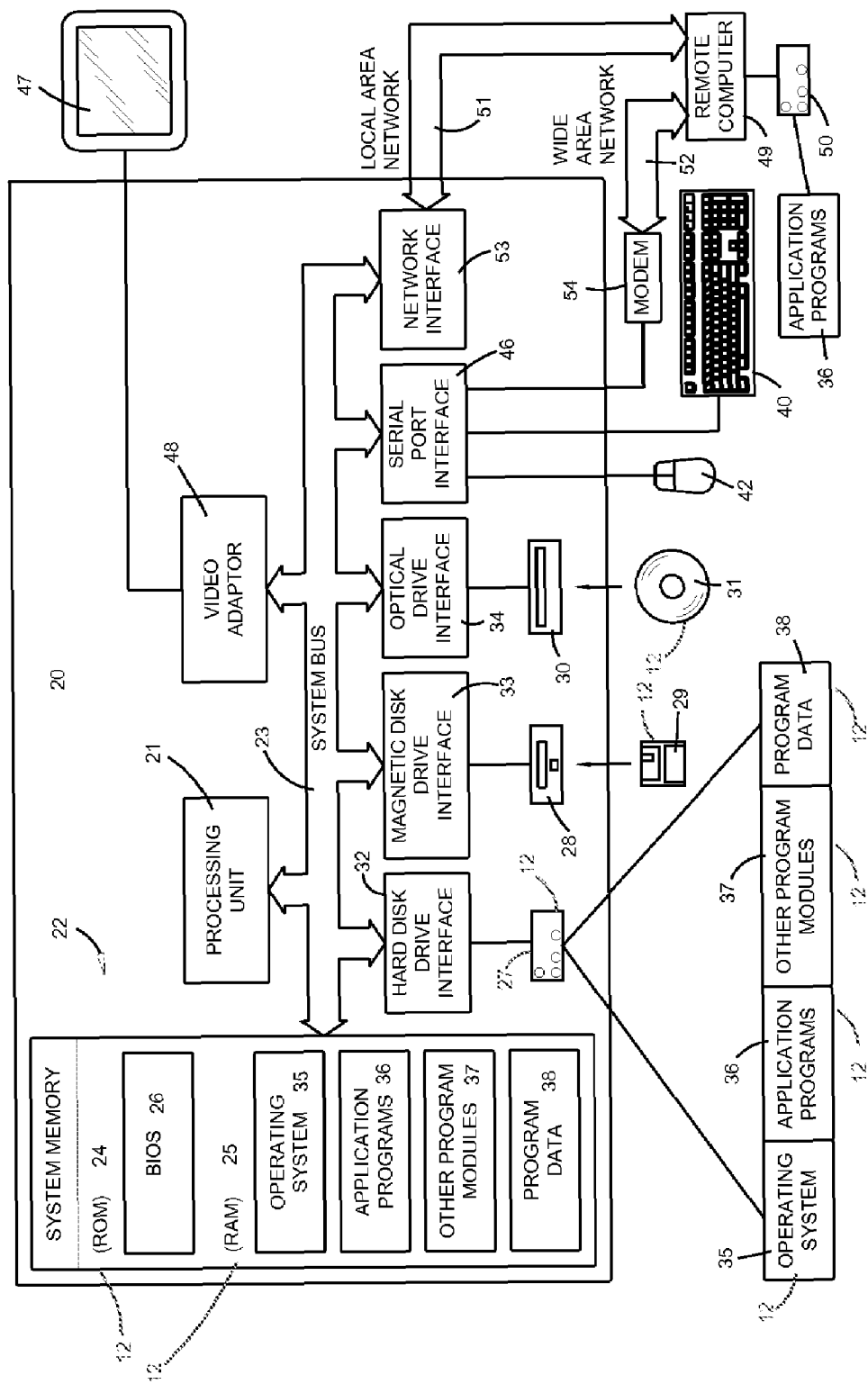
FIG. 1 is a schematic depiction of a representative computer system for implementing an exemplary embodiment of the invention.

FIG. 1 depicts an exemplary data processing system for practicing the disclosed invention utilizing a general purpose computer 20. A data mining software component that executes on the computer 20 accesses a database to extract data records stored within that database. An application program 36 either executing on the computer 20 or in communications with the computer 20 by means of a communications link such as a network 51 makes requests of a data mining engine.

As seen by referring to FIG. 1 the computer 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAM), read only memories (ROM), and the like, may also be used in the exemplary operating environment.

A number of program modules including the data mining software component 12 may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a Ian networking environment, the computer 20 is connected to the local network 51 through a network interface or adapter 53. When used in a wan networking environment, the computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Fuzzy Match

This section introduces concepts, definitions, and notation required for describing an exemplary embodiment of the present invention.

TABLE 1

An Example Reference Relation

| ID | Org. Name | City | State | Zipcode |
|----|-----------|------|-------|---------|
| R1 | Boeing Company | Seattle | WA | 98004 |
| R2 | Bon Corporation | Seattle | WA | 98014 |
| R3 | Companions | Seattle | WA | 98024 |

TABLE 2

Example Input Tuples

| Id | Org. Name | City | State | Zipcode |
|----|-----------|------|-------|---------|
| I1 | Beoing Company | Seattle | WA | 98004 |
| I2 | Beoing Co. | Seattle | WA | 98004 |
| I3 | Boeing Corporation | Seattle | WA | 98004 |
| I4 | Company Beoing | Seattle | NULL | 98014 |

Notation

Figure 2:
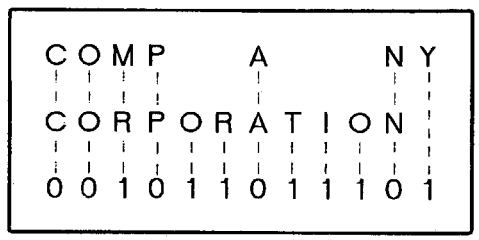
FIG. 2 is an illustration of the concept of similarity between tokens of corresponding attribute fields of a tuple or record in a database.

Edit Distance: The edit distance $ed(s_1, s_2)$ between two strings $s_1$ and $s_2$ is the minimum number of character edit operations (delete, insert, and substitute) required to transform $s_1$ into $s_2$, normalized by the maximum of the lengths of $s_1$ and $s_2$. For example, the edit distance between the strings 'company' and 'corporation' (FIG. 2) is 7/11≈0.64, and the sequence of edit operations is shown. Vertical lines indicate either exact matches (cost is 0) or substitutions (cost is 1). Characters in italics are deleted or inserted and always have a unit cost.

Reference Relation Let $R[tid, A_1, \ldots, A_n]$ be a reference relation where $A_i$ denotes the $i^{th}$ column. Assume that each $A_i$ is a string-valued attribute (e.g., of type varchar). Also assume that tid (for tuple identifier) is a key of R. Refer to a tuple whose tid attribute assumes value r as the tuple r. Use v[i] to denote the value as in the tuple $v[r, a_1, \ldots, a_n]$.

Tokenization: Let tok be a tokenization function which splits a string s into a set of tokens, tok(s), based on a set of delimiters (say, the white space characters). For example, tok(v[1]) of the tuple v=[R1, Boeing Company, Seattle, Wash., 98004] is {boeing, company}. Observe that one ignores case while generating tokens. For tokens generated from tuples, associate the column property—the column from which a token originates. The column property of tokens in tok(v[i]) is i. Consequently, a token 'john' in the name column of a customer relation may be considered different from the token 'John' in the city column. The token set tok(v) is the multiset union of sets $tok(a_1), \ldots, tok(a_n)$ of tokens from the tuple $v[r, a_1, \ldots, a_n]$. That is, if a token t appears in multiple columns, retain one copy per column in tok(v), distinguishing each copy by its column property. One says that a token t is in tok(v) if t is a member of some $tok(a_i)$, for $1 \leq i \leq n$.

Weight Function: Now adapt the IDF weight function to the relational domain by treating each tuple as a document of tokens. However, respect column boundaries in tuples and treat the same token string appearing in different columns as distinct tokens. The motivation for this definition is clear from the following example—expect the weight of token 'corporation' in the organization-name column to be less than that of 'united' since corporation is a frequent token in that column. Let the frequency of token t in column i, denoted freq(t, i), be the number of tuples v in R such that tok(v[i]) contains t. The IDF value, IDF(t, i), of a token t with respect to the $i^{th}$ column in the schema of R is computed as follows, when freq(t, i)>0, $$w(t, i) = IDF(t, i) = \log \frac{|R|}{freq\ (t, i)}$$

For a token t whose frequency in column i is 0, the philosophy is that t is an erroneous version of some token in the reference tuple. Since we do not know the token to which it corresponds is not known, define the weight w(t, i) to be the average weight of all tokens in the $i^{th}$ column of relation R. For clarity in presentation, when the column property of a token is evident from the context, use w(t) to denote w(t, i).

Fuzzy Similarity Function fms

Now define the similarity function fms used to compare two tuples. In a printed publication entitled "robust and efficient fuzzy match for online data cleaning." In Proceedings of ACM SIGMOD, San Diego, Calif., June 2003" it is demonstrated that fms is a better comparison function than earlier functions. The contents of this paper are incorporated herein by reference. As discussed in this paper, the similarity between an input tuple and a reference tuple is the cost of transforming the former into the latter—the less the cost, the higher the similarity. Consider the following transformation operations: token replacement, token insertion, and token deletion. Each operation is associated with a cost that depends on the weight of the token being transformed. Now describe the cost of each transformation operation. Let u and v be two tuples with the schema $R[A_1, \ldots, A_n]$. Consider only the case where u is an input tuple and v is a reference tuple, and one is interested in transforming u into v.

(i) Token replacement: The cost of replacing a token $t_1$ in tok(u[i]) by token $t_2$ from tok(v[i]) is $ed(t_1,t_2)*w(t_1,i)$. If $t_1$ and $t_2$ are from different columns, we define the cost to be infinite.

(ii) Token insertion: The cost of inserting a token t into u[i] is $c^{ins}.w(t, i)$, for a constant $0<c^{ins}<1$ (iii) Token deletion: The cost of deleting a token t from u[i] is w(t,i).

Observe that the costs associated with inserting and deleting an identical token may be different if $c^{ins}<1$. This asymmetry is useful, since in many scenarios it is more likely for tokens to be left out during data entry than it is for spurious tokens to be inserted. Therefore, absence of tokens is not penalized heavily.

Ignore the tid attribute while comparing tuples. Transforming u into v requires each column u[i] to be transformed into v[i] through a sequence of transformation operations, whose cost we define to be the sum of costs of all operations in the sequence. The transformation cost tc(u[i], v[i]) is the cost of the minimum cost transformation sequence for transforming u[i] into v[i]. The cost tc(u, v) of transforming u into v is the sum over all columns i of the costs tc(u[i], v[i]) of transforming u[i] into v[i].

$$tc(u, v) = \sum_i tc(u[i], v[i])$$

The transformation cost is deliberately defined to be asymmetric because one only consider the transformation of input tuples into reference tuples, and never the other way around. The minimum transformation cost tc(u[i], v[i]) can be computed using the dynamic programming algorithm used for edit distance computation T. F. Smith and M. S. Waterman, Identification of common molecular subsequences, *Journal of Molecular Biology*, 147:195-197, 1981.

Consider the input tuple u[Beoing Corporation, Seattle, Wash., 98004] in Table 2 and the reference tuple v[Boeing Company, Seattle, Wash., 98004]. The transformation of u[1] into v[1] requires two operations—replacing 'beoing' by 'boeing' and replacing 'corporation' by 'company'. The function tc(u[1], v[1]) is the sum of costs of these two operations; assuming unit weights on all tokens, this is 0.97 by adding 0.33 for replacing 'beoing' with 'boeing' which are at an edit distance 0.33, and 0.64 for replacing 'corporation' with 'company' which are at an edit distance 0.64. In this example, only tc(u[1],v[1]) is nonzero among column-wise transformation costs.

Definition of f: Now define the fuzzy match similarity function fms(u, v) between an input tuple u and a reference tuple v in terms of the transformation cost tc(u, v). Let w(u) be the sum of weights of all tokens in the token set tok(u) of the input tuple u. Similarity between u and v is defined as:

$$fms(u, v) = 1 - \frac{tc(u, v)}{w(v)}$$

In the above example involving I3 and R1, w(I3)=5.0 because there are five tokens in tok(I1) and the weight of each token is 1.0. Therefore, fms(I3, R1)=1−0.97/5.0=0.806. As in the case of the transformation cost, we define fms asymmetrically for reasons discussed earlier.

The Duplicate Identification Problem

This section formalizes the problem of detecting fuzzy duplicates. Alternate possibilites for formalizing the problem are disclosed. The alternatives differ in the "structure" to be induced by the duplication function within each group of duplicates. That is, if one imagines tuples and their duplication relationship to be described by a graph where each node corresponds to a tuple and two nodes are connected by an edge if they are duplicates then the (sub-)graph induced by a group of duplicates has to have a certain structural form. For example, the group may have to induce a "star" or an "almost clique."

Figure 3:
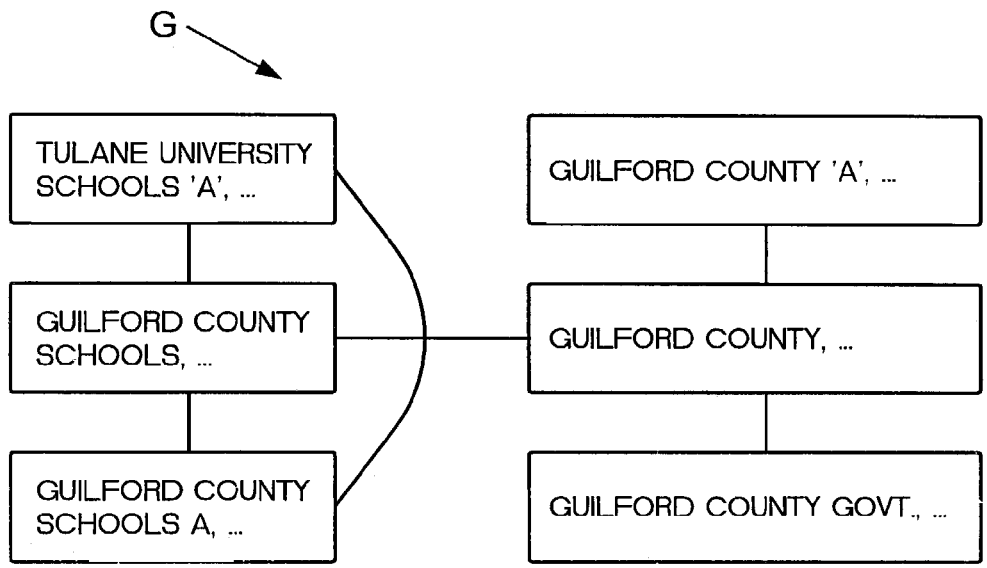
FIGS. 3 and 4 are graphs wherein nodes of the graph are tuples from a database and wherein similarity between tuples is illustrated by means of edges connecting nodes of the graph.

Formalizing these alternatives, it is instructive to review the previous formulation of the duplicate elimination problem, which assumed that the duplication function is transitive. That is, if v1 is a duplicate of v2, and v2 is a duplicate of v3, then it is assumed that v1 is also a duplicate of v3. However, most duplication functions are threshold-based similarity functions, which are not transitive. As an illustrative example, consider FIG. 3. If transitivity of the duplication function is assumed, all six tuples in FIG. 3 are fuzzy duplicates. The fundamental issue with the assumption of transitivity is that it supposes the duplication function to not make any false positive errors, i.e., it can never say that a tuple is a duplicate of another tuple, if it is not so. However, this assumption does not always hold with real data using a threshold based function.

Now define the duplication function dup, which is required for formalizing both alternatives. It is a threshold similarity function defined over the similarity function fms discussed earlier. That is, dup(v1, v2)=1 iff fms(v1, v2)>c, where 0<c<1.

The Star Alternative

The intuition behind this first formalism is that the ideal duplication function is such that each group of duplicates induces a "star" where the center of the star is the canonical representative tuple. All tuples on the fringe of the star are duplicates of the central canonical tuple. If the duplication function was ideal, then the process would be able to uniquely partition the entire relation into such star groups. The uniqueness is guaranteed by the precise ideal duplication function. In practice, duplication functions are only approximations of the ideal duplication function. Hence, there potentially could be multiple partitions of the relation into star groups. In such a (realistic) scenario, the goal is to choose a partition that maximizes the overall similarity of the tuples on the fringes of the stars with the central tuples. In this alternative, the duplicate identification problem is defined as follows.

Duplicate Identification Problem (DE1):

Let $R[A_1, \ldots, A_n]$ be an input relation having attributes, $A_1 \ldots A_n$, and let dup(v1, v2) be a duplication function based on the similarity function sim. Let G(R, dup) be a graph where each tuple in R has a corresponding node in G, and two nodes in G are connected by an edge iff their corresponding tuples are considered duplicates by dup. Let partition(G) be a partition of the vertex set of G into disjoint star groups $G_1, \ldots G_m$ with central tuples $g_1^*, \ldots, g_m^*$. Let $crit(G, \{G_1, \ldots, G_m\})$ be the total similarity of the fringe tuples with the central tuples.

$$crit(G, \{G_1, \ldots, G_m\}) = \sum_i \sum_{g \neq g_i^*} sim(g, g_i^*)$$

The duplicate identification problem is that of determining a partition $\{G_1, \ldots, G_m\}$ and central tuples $g_1^*, \ldots, g_m^*$ for each group in the partition such that crit(G(R, dup), $\{G_1, \ldots, G_m\}$) is maximum among all possible partitions of G into star groups. For the example in FIG. 1, if we assume that all edges are associated with a similarity of 1.0, the solution partition is {{[Guilford County Schools 'A', . . . ], [Guilford county Schools A, . . . ], [Guilford County Schools, . . . ]*}, {[Guilford County 'A', . . . ], [Guilford County Govt, . . . ], [Guilford County, . . . ]*}} where the central tuple in each group is marked by *.

The Almost Clique Alternative

The intuition behind this formalism is that reasonable duplication functions make only a small number of mistakes relative to their correct decisions. Hence, their overall number of accurate predictions between tuples within a group of duplicates is more correct than the number of incorrect predictions. Below, are definitions of reasonable approximations of duplication functions, the duplicate elimination problem, and a discussion of the quality of the formalism.

Let R be a relation, and let dup: $R \times R \rightarrow \{0,1\} \times [0,1]$ be a duplication function. Given a pair of tuples in R, let $dup(v_1, v_2) = [x, sim]$, the first component or $dup(v_1, v_2)[1]$ is $=x$ and the second component or $dup(v_1, v_2)[2]$ is $=sim$, i.e., $dup(v_1, v_2)[i]$ denotes the $1^{th}$ coordinate of $dup(v_1, v_2)$. The function 'dup' considers $v_1$ a duplicate of $v_2$ if $x=1$; sim is called the similarity score between $v_1$ and $v_2$. Let dup*: $R \times R \rightarrow \{0,1\} \times [0,1]$ be an ideal duplication function, one that does not make any mistakes while determining whether two tuples are duplicates or not. For any tuple v in R, let dup(v, R) denote the set of tuples in R that are considered to be duplicates of v by dup. Similarly, let dup*(v, R) denote the set of tuples considered to be duplicates by dup*. Given a set S of tuples in R, let $avg_{dup}(v, S)$ denote the average strength of edges between v and any tuple in S. The number of mistakes of dup relative to dup* at each tuple v in R characterizes how good an approximation dup is. If the approximation is reasonably good, one can formalize the duplicate elimination problem such that the ideal grouping is obtained even if dup is used.

Let $0 \leq \delta \leq 1$ be a constant. dup is a $\delta$-approximation of dup* at v, if $$\frac{|dup(v, R) \Delta dup*(v, R)|}{|dup*(v, R)|} \leq \delta,$$

and $avg_{dup}(v, dup(v, R) \cap dup*(v, R)) > avg_{dup}(v, dup(v, R) - dup*(v, R))$.

APX1: One can conclude that dup is an APX1 approximation of dup* if dup is a $\delta$-approximation of dup* over R if dup is a delta-approximation of dup* at all tuples in R.

APX2: One can conclude that dup is an APX2 approximation of dup*, if for $0 < \delta_1, \delta_2 < 1$, if dup is $\delta_1$-approximation of dup* on at least $\delta_2 * |R|$ tuples of R.

Intra-group Strength: Let $\{G_1, \ldots, G_K\}$ be a partition of the relation R into K ($\geq 1$) groups. The intra-group strength $IGS_{dup}(\{G_1, \ldots, G_K\})$ of the partition is the sum over all groups of the number of all edges between pairs of tuples that belong to the same group.

$$IGS_{dup}(\{G_1, \ldots, G_K\}) = \sum_{Gi} \sum_{vi \neq vj} dup(v_i, v_j)[1] \cdot dup(v_i, v_j)[2]$$

Second Duplicate Elimination Problem (DE2): Given a relation R, and a duplication function dup, partition R into a set of K ($\geq 1$) groups $\{G_1, \ldots, G_K\}$ such that the intra-group strength $IGS_{dup}(\{G1, \ldots, GK\})$ of the partition is maximum among all partitions in which each group satisfies the majority neighborhood constraint.

Figure 4:
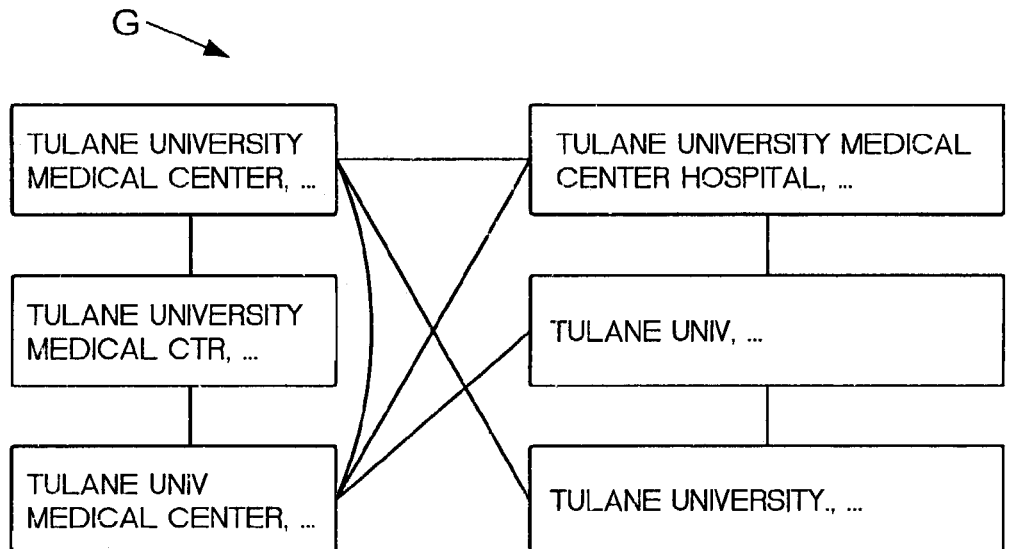

Consider a few boundary cases. Consider a relation where each tuple is considered a duplicate of the other by dup. Then, the solution of DE consists of just one group. At another extreme, consider a relation where all tuples are distinct. Now, the solution for DE2 is a partition where each tuple forms its own group. FIGS. 3 and 4 show graphs G for some data examples that were taken from a relation in a real data warehouse. For the example in FIG. 3, assuming that all edges between nodes are associated with a similarity of 1.0, DE2 partitions them correctly into two groups, one consisting of the three tuples on the left and another consisting of the three on the right. In contrast, DE1 includes "Guilford County" on the right along with the group on the left. The remaining tuples on the right are put in their own groups. For the example in FIG. 4, assuming that all edges have a similarity of 1.0, DE2 partitions them into two groups: the first group consists of the three tuples on the left and the topmost tuple on the right, and the second group consists of the bottom two tuples on the right.

It is now shown that the solution of DE for reasonably accurate duplication functions is very close to that obtained by using an ideal duplication function (which we may not have access to). These results illustrate the robustness of the DE2 formulation. This intuition is partially formalized by the following lemma which states that DE2 recovers the partitioning obtained by an ideal duplication function dup* if dup is an APX1 approximation of dup*.

Lemma 1: Suppose the duplication function dup satisfies APX1 with respect to the ideal duplication function dup*. Then, the solutions for DE using dup and dup* are identical. Proof Sketch Let $P^* = \{G_1^*, \ldots, G_{K^*}^*\}$ be the solution of DE for dup*. Consider any group $G_i^*$ in $P^*$. Because dup satisfies APX1, adding a new vertex not in $G_i^*$ or removing a vertex in $G_i^*$ will always decrease the overall intra-group strength, even if the removal or addition results in a valid partition.

The difference between the duplicate elimination problem as formalized above and the clustering problem is that the number of clusters (or groups) is unknown in the former.

Implementation

The process for solving the duplicate identification problem is performed in two phases. A first neighborhood graph generation phase identifies pairs of tuples that are considered duplicates according to the duplication function—the thresholded similarity function. Based on the output of the first phase, a second partitioning phase partitions the set of all tuples into groups such that each group consists of fuzzy duplicates (and satisfies either the star or almost-clique properties). Further, the second phase also returns a canonical representative tuple for each group.

Neighborhood Generation Phase

The process first prepares a graph G(R, dup) from the input relation R. The graph preparation relies on the fuzzy match algorithm described in greater detail in Surajit Chaudhuri, Kris Ganjam, Venkatesh Ganti, Rajeev Motwani. Robust and efficient fuzzy match for online data cleaning. In Proceedings of ACM SIGMOD, San Diego, Calif., June 2003 (incorporated herein by reference). When given a tuple v and a threshold c returns all tuples in R whose similarity with v is greater than c. The process invokes the fuzzy match algorithm for each tuple in R, and constructs its neighborhood. When the fuzzy match algorithm is called for all tuples in R, one has the neighborhoods of each tuple in R, and hence the graph G(R, dup) is available. One embodiment materializes the neighborhood set of each tuple in R into a relation $N_R$.

Partitioning Phase

In this phase, the exemplary embodiment partitions the neighborhood graph obtained above into groups such that each group has the required structure.

Star Alternative

This process is similar to that developed by (See J. A. Aslam, K. Pelekhov, D. Rus. Static and Dynamic Information Organization with Star Clusters. *CIKM* 1998, pages 208-217. and J. A. Aslam, K. Pelehov, D. Rus. A Practical Clustering Algorithm for Static and Dynamic Information Organization. *ACM-SIAM Symposium on Discrete Algorithms*, 1999). It adopts a "greedy" approach that identifies the heaviest star in the neighborhood graph and then removes this star. The process then iterates on the residual graph.

For each node v in the neighborhood graph, define its score as the sum of all edges incident on v. That is, the score represents the weight of the star formed with v as the center and all tuples that are duplicates of v as the fringe of star. In the greedy algorithm, identify the node v with the highest score. Then remove the star (all the nodes and all edges emanating from these nodes) formed around this node v as the center from the neighborhood graph. The node v is the canonical tuple for this set of duplicate tuples. Then continue with the residual graph, picking the node with the highest score, removing its group and so on until the residual graph is empty. The underlying assumption is that all nodes which belong in the same group would have been identified to be close to the canonical node and hence would have an edge to that node.

The Almost Clique Alternative

In the general case, the DE2 problem is at least as hard as the NP-complete problem of partitioning a graph into cliques. The reduction is obtained by considering the case when δ=1.0 and when similarities associated with each edge is also 1.0. Therefore, we use efficient and high quality heuristics employed for partitioning a graph into dense subgraphs. Most of these heuristics require the computation of the first few eigen vectors of the adjacency matrix corresponding to the original graph G, and hence are at least quadratic in the number of vertices (also, the number of tuples) in G. We further improve these algorithms by exploiting a characteristic peculiar to the duplicate elimination scenario: the graph G is very sparse. Therefore, we first partition the graph G into disjoint connected components $\{G1', \ldots, Gk'\}$. Since G is sparse, we expect each connected component to be much smaller than G itself. Each group in the partition of G into $\{G_1', \ldots, Gk'\}$ is the union of one or more groups in the partition $\{G_1', \ldots, G_K\}$ that is the solution of DE2. Therefore, we now independently partition each disjoint connected component $G_i'$ into $G_{i1}, \ldots, G_{iki}$ using the heuristic approaches mentioned earlier. Thus, the overall performance (quadratic only in the sizes of $G_i'$) is considerably better than using the heuristic approach on the entire graph G.

The process for solving DE2, in general, is more expensive than the algorithm for solving DE1. And, a large number of groups consist of only two or at most three tuples. When these groups are also disconnected with any of the remaining nodes in G, the star partitions and almost clique partitions usually yield the same result. Based upon this intuition a Hybrid process is developed.

Hybrid Algorithm

In view of the above observation that both star and almost clique formulations diverge only for groups of size larger than 4, a hybrid approach was developed. First partition the graph G into disconnected components. For all components of size less than or equal to 3 (which constitute the majority), use the fast star partitioning algorithm. For all larger partitions, use the higher quality partitioning solutions for identifying dense components.

Figure 5:
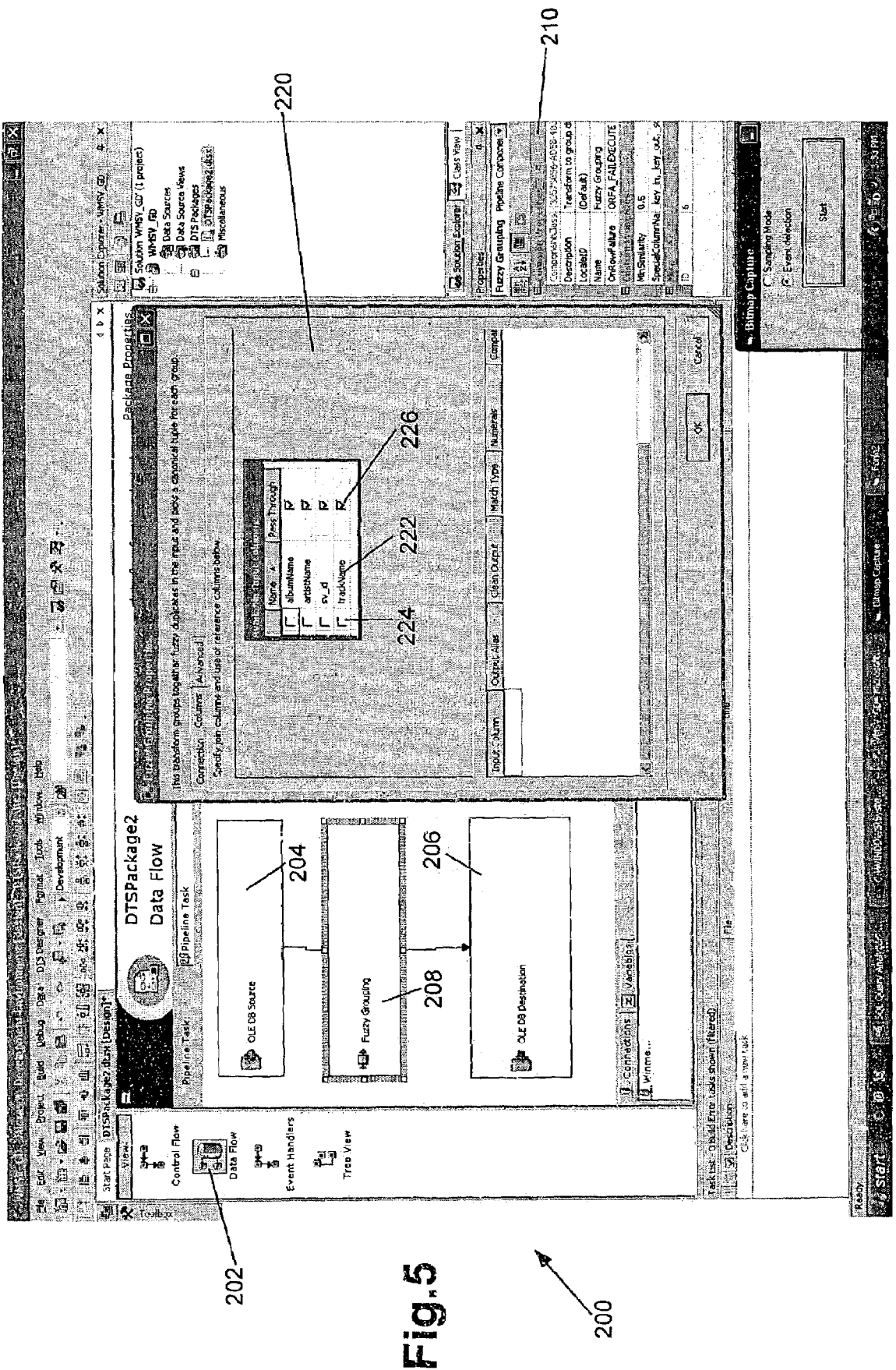
FIG. 5 is a user interface by which data cleaning is initiated and parameters used in that cleaning are set by a user.

FIG. 5 is a user interface 200 for use with an exemplary embodiment of the invention. A user launches a data flow application by clicking on a data flow icon 202 displayed on the interface 200. This allows a data source 204 and a data destination 206 to be chosen and a data operation such as grouping of similar records 208 to be performed. By choosing the fuzzy grouping selection of a properties window 210, the interface 200 launches a window 220 which presents the attributes 222 of the data source as a list. Checkboxes 224 to the left of the list of attributes allow the user to check which attributes to use in cleaning the data in the source. If a pass through box 226 for that attribute is checked, however, the data in that attribute is left unaffected by the cleaning process, even though that attribute contributes to similarity testing between tuples or records.

While the invention has been described with a degree of particularity, it is the intent that the invention include all modifications and alterations from the disclosed design falling within the spirit or scope of the appended claims.

The invention claimed is:

1. A computer implemented method for removing similar data records from a set of data records comprising:
   providing a number of data records from the set of data records, from which one or more canonical data records are to be identified;
   determining similarity scores for the number of data records based on the contents of the data records;
   grouping together data records whose similarity score with respect to each other is greater than a threshold, wherein one or more groups of data records form nodes of a graph, and further wherein edges between nodes represent a similarity score between data records of a group; and
   within each said group of data records, identifying a canonical record based on the similarity of data records to each other within each group,
   wherein the set of data records is from a database table and within each group of data records, data records similar to the canonical record of the group are removed from the database table while leaving the canonical record stored in the database table,
   wherein the similarity scores are determined by identifying tokens contained within data records and distinguishing the tokens according to respective attribute fields associated with the tokens and assigning a similarity score to data records in relation to other data records based on a similarity between tokens of said data records and said other data records, wherein a same token in two different data records is evaluated differently when assigning similarity score if the same token in the two different data records is associated with two different attribute fields respectively.

2. The method of claim 1 wherein inter record similarity scores are determined for all data records in a reference table and a first group is identified as a group having a record node with a highest total similarity score.

3. The method of claim 2 wherein all data records within a group are removed from the graph before additional groups and canonical records are identified.

4. The method of claim 1 wherein the canonical record is chosen from data records in each group by summing the similarity scores of data records found to be similar to each other based on the threshold.

5. A system for removing duplicate data records from a set of data records comprising:
   a processor;
   an application program executed by the processor for:
   providing a number of data records from the set of data records, from which one or more canonical data records are to be identified;
   determining similarity scores for the number of data records based on the contents of the data records;
   grouping together data records whose similarity score with respect to each other is greater than a threshold, wherein one or more groups of data records form nodes of a graph, and further wherein edges between nodes represent a similarity score between data records of a group; and
   within each said group of data records, identifying a canonical record based on the similarity of data records to each other within each group,
   wherein the set of data records is from a database table and within each group of data records, data records similar to the canonical record of the group are removed from the database table while leaving the canonical record stored in the database table,
   wherein the similarity scores are determined by identifying tokens contained within data records and distinguishing the tokens according to respective attribute fields associated with the tokens and assigning a similarity score to data records in relation to other data records based on a similarity between tokens of said data records and said other data records, wherein a same token in two different data records is evaluated differently when assigning similarity score if the same token in the two different data records is associated with two different attribute fields respectively.

6. The system of claim 5 wherein inter record scores are determined for all records in a reference table and a first group is identified as a group having a record node with a highest total similarity score.

7. The system of claim 6 wherein all records within a group are removed from the graph before additional groups and canonical records are identified.

8. The system of claim 5 wherein the canonical record is chosen from data records in a group by summing the similarity scores of records found to be similar to each other based on the threshold.

9. A machine readable medium including instructions for executing on a computer for finding and removing similar data records from a set of data records comprising instructions for:
   providing a number of data records from the set of data records, from which one or more canonical data records are to be identified;
   determining similarity scores for the number of data records based on the contents of the data records;
   grouping together data records whose similarity score with respect to each other is greater than a threshold, wherein one or more groups of data records form nodes of a graph, and further wherein edges between nodes represent a similarity score between data records of a group; and
   within each said group of data records, identifying a canonical record based on the similarity of data records to each other within each group,
   wherein the set of data records is from a database table and within each group of data records, data records similar to the canonical record of the group are removed from the database table while leaving the canonical record stored in the database table,
   wherein the similarity scores are determined by identifying tokens contained within data records and distinguishing the tokens according to respective attribute fields associated with the tokens and assigning a similarity score to data records in relation to other data records based on a similarity between tokens of said data records and said other data records, wherein a same token in two different data records is evaluated differently when assigning similarity score if the same token in the two different data records is associated with two different attribute fields respectively.

10. The machine readable medium of claim 9 wherein inter record scores are determined for all records in a reference table and a first group is identified as a group containing a record node having a highest total similarity score determined from its similarity score with other record nodes.

11. The machine readable medium of claim 10 wherein all records within a group are removed from the graph before any additional groups and canonical records are identified.

12. The machine readable of medium 9 wherein the canonical record is chosen from data records in a group by summing the similarity scores of records found to be similar to each other based on the threshold.

* * * * *